United States Patent [19]

Wiedrich et al.

[11] Patent Number: 4,927,546
[45] Date of Patent: May 22, 1990

[54] METHOD FOR INHIBITING GROWTH OF ALGAE IN RECREATIONAL WATER

[75] Inventors: Charles R. Wiedrich, Wadsworth, Ohio; Edward J. Sare, Berkeley Heights, N.J.

[73] Assignee: PPG Industries, Inc., Pittsburgh, Pa.

[21] Appl. No.: 276,728

[22] Filed: Nov. 28, 1988

[51] Int. Cl.$^5$ .............................................. C02F 1/76
[52] U.S. Cl. .................................. 210/755; 210/756; 210/764
[58] Field of Search ............... 210/755, 764, 765, 756; 422/37; 514/376; 424/661; 71/67

[56] References Cited

U.S. PATENT DOCUMENTS

| | | | |
|---|---|---|---|
| 2,399,118 | 4/1946 | Homeyer et al. | 260/307 |
| 3,452,137 | 6/1969 | Mills et al. | 424/149 |
| 3,591,601 | 7/1971 | Walles | 260/307 |
| 3,931,213 | 1/1976 | Kaminski et al. | 260/307 |
| 4,000,293 | 12/1976 | Kaminski et al. | 434/272 |
| 4,659,484 | 4/1987 | Worley et al. | 210/755 |

OTHER PUBLICATIONS

"A Novel Chloramine Compound for Water Disinfection", H. D. Burkett et al, Water Resources Bulletin, vol. 17, No. 5, pp. 874–879, Oct. 1981.

"Potential New Water Disinfectants", S. D. Worley et al, Water Chlorination: Environmental Impact and Health Effects, vol. 5, Ch. 98 (1985).

"Comparisons of a New N-Chloramine Compound with Free Chlorine as Disinfectants for Water", S. D. Worley et al, Progress in Chemical Disinfection, Proceedings of the Second Biannual Conference, pp. 45-60 (1984).

"New Antimicrobial Agents for Treatment of Water", S. D. Worley et al, NTIS, Report WO55507 (PB82-168535), Nov. 30, 1981.

*Primary Examiner*—Peter Hruskoci
*Attorney, Agent, or Firm*—Irwin M. Stein

[57] ABSTRACT

Recreational water, e.g., swimming pools, as opposed to industrial water, containing a source of free available halogen, e.g., chlorine, is treated with amounts of a 2-oxazolidinone, e.g., 4,4-dimethyl-2-oxazolidinone to thereby inhibit the growth of algae during the absence of biocidal amounts of free available halogen.

11 Claims, No Drawings

METHOD FOR INHIBITING GROWTH OF ALGAE IN RECREATIONAL WATER

DESCRIPTION OF THE INVENTION

It is common to treat stored bodies of water, e.g., recreational water, regularly with sanitizing chemicals to eradicate disease-carrying bacteria and algae. Chlorine and certain compounds containing chlorine have been and continue to be the foremost sanitizers used for disinfecting such bodies of water. Chlorine gas, sodium hypochlorite solutions, calcium hypochlorite and chloroisocyanurates are the most commonly used water sanitizers that provide free available chlorine in water to be disinfected. Bromine and certain compounds containing bromine are used similarly but to a much lesser extent.

A drawback to the use of chemical sanitizers that provide free available chlorine is their relatively short life when added to a body of water containing an organic load. Therefore, it is necessary to treat periodically such bodies of water with sanitizing chemicals in order to eradicate deleterious amounts of bacteria and algae in the water.

Stored bodies of recreational water, such as swimming pools, hot tubs, spas, etc., serve as breeding grounds for various types of algae which grow in the water and on the sides and bottom of the vessel containing the water. Unchecked growth of algae results in cloudy and discolored water, the development of malodors, unsightly growth on the walls and bottom of the vessel, e.g., the pool or tub, stubborn stains, clogging of filters, a safety hazard for swimmers, halamine, e.g., chloroamine, formation, increased demand for sanitizers, and a breeding ground for bacteria.

The three forms of algae commonly found in recreational bodies of water, such as swimming pools, are fast-growing green algae, slow-growing blue-green algae and mustard or yellow algae. Once established in pool water, green algae is eradicated usually by shocking the pool with massive doses of chlorine. Since green algae remains suspended in the water, filtration of the water subsequent to shock treatment will physically remove the algae; but such a treatment mode can require as much as seventy-two hours before the water is clear enough to use.

Yellow algae is more resistant to treatment because it grows on the containment vessel wall and penetrates cracks, crevices and tile grouting. Superchlorination (shock treatment) of the water is conjunction with mechanical scrubbing will remove most of this form of algae. Particularly resistant patches of yellow algae may be removed by application of a sanitizing chemical, e.g., trichloroisocyanuric acid or calcium hypochlorite, directly to the affected area. However, such methods are time consuming and expensive.

While regular treatment of a stored body of recreational water with biocidal amounts of sanitizing chemicals will prevent the growth of algae and kill spores of algae carried into the water by wind and rain, a regimen of regular chemical treatment is often interrupted during periods of non-use, such as during periods of vacation. Moreover, when sanitizer replenishment is neglected, algae may begin to grow quickly.

It is desirable, therefore, to provide a composition and method which will prevent or inhibit the growth of algae in stored recreational bodies of water, such as swimming pools, hot tubs and spas during those periods when treatment of the water with biocidal, e.g., algicidal, amounts of free available halogen, e.g., chlorine, cannot be or are not performed.

DETAILED DESCRIPTION OF THE INVENTION

It has now been discovered that certain 2-oxazolidinone derivatives, e.g., 4,4-di($C_1$–$C_4$)alkyl-2-oxazolidinones, more particularly 4,4-dimethyl-2-oxazolidinone, may be added to recreational water that contains (or is treated to contain) a source of free available halogen, e.g., chlorine, to inhibit or prevent the growth of algae in such water for a short period when biocidal amounts of free available halogen, e.g., chlorine, are not present in the water. More particularly, it has been found that such 2-oxazolidinones may be used in amounts which are algistatic and not algicidal in order to inhibit the growth of algae in such bodies of water during interruption of the normal regimen of sanitizer addition to the water.

While not intending to be bound by any particular theory, it is contemplated that the 2-oxazolidinone charged to recreational water combines with free available halogen, e.g., chlorine or bromine, present in the water to form in-situ a 3-halo-2-oxazolidinone e.g., 3-chloro-4-4-di($C_1$–$C_4$)alkyl-2-oxazolidinone, which is relatively stable under use conditions and which will provide a source of combined available halogen, e.g., combined available chlorine, when the amount of free available halogen in the water is exhausted, thereby inhibiting the growth of algae. The presence of the 3-halo-2-oxazolidinone in the body of recreational water to which algistatic amounts of the 2-oxazolidinone is added can be expected to control the growth of significant quantities of algae for a time, e.g., two to three weeks, (in the absence of an unusually large and sudden infusion of organic load) until sanitizer in the water is replenished.

U.S. Pat. Nos. 3,931,213, 4,000,293, and 4,659,484 describe the preparation of 3-chloro-2-oxazolidinones and further describes their use as bactericides. The efficiency of 3-chloro-4,4-dimethyl-2-oxazolidinone for water disinfection has been described in a number of publications, such as, "A Novel Chloramine Compound for Water Disinfection" by H. D. Burkett et al, Water Resources Bulletin, Vol. 17, No. 5, pages 874–879, Oct. 1981; "Potential New Water Disinfectants" by S. D. Worley et al, Water Chlorination: Environmental Impact and Health Effects, Vol. 5, Chapter 98, R. L. Jolley, Ed. (1985); "Comparisons of a New N-Chloramine Compound with Free Chlorine as Disinfectants for Water", by S. D. Worley et al, Progress in Chemical Disinfection, Proceedings of the Second Biannual Conference, pp. 45–60 (1984); and "New Antimicrobial Agents For Treatment of Water" by S. D. Worley et al, NTIS, Report W 055507 (PB82-168535). These publications, however, do not address the efficacy of 3-chloro-4,4-dimethyl-2-oxazolidinone against algae in the absence of biocidal amounts of free available chlorine.

The 2-oxazolidinones and their halogenated derivatives described herein are relatively stable in aqueous solution under conditions, e.g., temperature, pH, etc., generally existing in recreational water. Small amounts, e.g., algistatic amounts, of the 2-oxazolidinones, e.g., from about 0.05 to 4.5 parts of the 2-oxazolidinone per million parts of water (ppm), are presently considered to be sufficient to keep the water free of significant amounts of growing algae over a period of two to three weeks under normal conditions, i.e., in the absence of a large infusion of organic load subsequent to the last treatment of the water with biocidal amounts of a sanitizing chemical, e.g., chlorine or calcium hypochlorite.

The 2-oxazolidinones that may be used in the present process may be represented by the following graphic formula I:

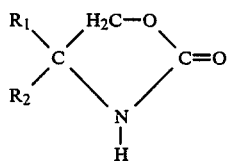

wherein $R_1$ is $C_1-C_4$ alkyl, such as methyl, ethyl, propyl, isopropyl, butyl, isobutyl and secondary butyl, and $R_2$ is selected from the group $R_1$, i.e., $C_1-C_4$ alkyl, hydroxy, hydroxymethyl, $C_1-C_4$ alkoxy, such as methoxy, ethoxy, propoxy, isopropoxy and butoxy, e.g., n-butoxy, isobutoxy and secondary butoxy, and substituted phenyl (-Ph-R), particularly para-substituted phenyl, wherein Ph is bivalent substituted phenyl (phenylene) and said phenyl substituent, R, is selected from the group consisting of $C_1-C_4$ alkyl, $C_1-C_4$ alkoxy and hydroxy. Preferably, $R_1$ and $R_2$ are each a $C_1-C_4$ alkyl and, more preferably, are $C_1-C_2$ alkyl, e.g., methyl and ethyl. Still more preferably, $R_1$ and $R_2$ are the same, and are methyl.

Examples of suitable 2-oxazolidinones that may be used in the present method include: 4,4-dimethyl-2-oxazolidinone, 4,4-diethyl-2-oxazolidinone, 4-methyl-4-ethyl-2-oxazolidinone, 4-methyl-4-hydroxy-2-oxazolidinone, 4-methyl-4-methoxy-2-oxazolidinone, 4-methyl-4-hydroxymethyl-2-oxazolidinone, and 4-methyl-4-p-methylphenyl-2-oxazolidinone. By substitution of other $R_1$ and $R_2$ substituents described herein at the 4-position of the 2-oxazolidinone, other analogous oxazolidinone derivatives may be named. The preferred 2-oxazolidinone is 4,4-dimethyl-2-oxazolidinone. The corresponding halogen-containing 2-oxazolidinones are named 3-chloro-(or 3-bromo-)-4,4-A-2-oxazolidinones, wherein A represents the $R_1$ and $R_2$ *substituents, e.g.,* 3-chloro-4,4-dimethyl-2-oxazolidinone.

The 2-oxazolidinones described herein may be prepared by reaction of the corresponding alkanolamine with a di(lower alkyl) carbonate, such as diethyl carbonate, in the presence of a strong base such as an alkali metal alkoxide, e.g., sodium methoxide, or with phosgene. See, for example, U.S. Pat. No. 2,399,118.

In practicing the method of the present invention, an algistatic amount of the 2-oxazolidinone is established in a stored body of water that contains or is treated to contain a source of halogen, e.g., chlorine. By algistatic is meant that a sufficient amount of the 2-oxazolidinone is introduced into the halogen-containing water to thereby inhibit or prevent the significant growth of algae but that such amounts are insufficient to kill the microorganism, i.e., the 2-oxazolidinone is not used in algicidal (biocidal) amounts. Stated differently, an algistatic amount of the 2-oxazolidinone (in combination with the source of halogen) will provide at least 50 percent control of an algae in a biological primary culture of the algae for three weeks. Algistatic amounts of 2-oxazolidinone will vary with the particular recreational body of water treated and will depend on such parameters as water temperature, pH, and the level of exposure of the water to sunlight. Generally, between about 0.05 and 4.5 parts of the 2-oxazolidinone per million parts of water (ppm), more particularly between about 2 and about 4 ppm of 2-oxazolidinone, is added to a body of recreational water to inhibit the growth of algae therein.

The 2-oxazolidinone compound may be charged to the body of recreational water during, prior to, or subsequent to a regular treatment of the water with halogen or halogen-containing sanitizers, e.g., chlorine gas or chlorine compounds providing free available chlorine, such as a sodium hypochlorite solution, calcium hypochlorite and chloroisocyanurates. In one embodiment, it is contemplated the 2-oxazolidinone may be introduced into the water when the biocidal sanitizer is substantially deleted. In a preferred, embodiment, the 2-oxazolidinone compound is incorporated during normal sanitizer treatment of the body of water, e.g., when the water is treated with biocidal amounts of sanitizer, such as a source of free available chlorine (FAC), so that the level of combined available chlorine from the chlorine-containing 2-oxazolidinone is from about 0.03 to about 2.8 ppm, e.g., 1.2 to about 2.5 ppm.

Thus, the 2-oxazolidinone may be introduced into the body of water in amounts of from about 0.05 or 0.1 to 4.5 ppm followed by a sufficient quantity of a source of halogen to provide from about 5 to about 10 ppm, e.g., 8 to 10 ppm, of free available halogen, e.g., chlorine. During an ensuing period when previously introduced amounts of free available halogen have become exhausted and sanitizer replenishment of the water is not performed, i.e., biocidal amounts of sanitizer are not introduced into the water and such amounts are therefore absent, halogen, e.g., chlorine, of the combined available halogen from the halogen-containing 2-oxazolidinone will inhibit growth of algae in the water for periods of up to about three weeks of no maintenance (no addition of sanitizers such as biocidal amounts of FAC). Following this period of no maintenance, the water may be re-standardized, i.e., free available halogen, e.g., chlorine, or other sanitizing chemicals are introduced into the water to their normal levels. Standardization is typically accomplished by superchlorination of the water to remove any organic matter, bacteria and algae that accumulated during the period of no maintenance. Standardization will also regenerate the halogen-containing 2-oxazolidinone, thereby providing a continuum of a residual source of combined available halogen.

Commonly, the temperature of recreational water will vary from about 18° C. to about 43° C., the latter being temperatures which have been described as being used in hot tubs. The pH of recreational water will optimally range between about 7.2 and 7.6 for bather comfort and efficiency of disinfection by chlorine (Cl+) sanitizers.

Free available chlorine (FAC) is chlorine in the form of hypochlorous acid (HOCl) or hypochlorite ion (ClO−). The recommended free available chlorine concentration in swimming pools is between about 1 and about 3 ppm. In hot tubs, the recommended free available chlorine concentration is between about 1 and about 5 ppm free available chlorine. Combined available chlorine (CAC) is chlorine provided by chloramines, i.e., compounds containing one or more chlorine atoms attached to a nitrogen atom.

The chlorine content of recreational, e.g., pool, water may be determined colorimetrically using the Palin DPD test using N,N-diethyl-p-phenylenediamine. The colorimetric test measures the hypochlorous acid content or free available chlorine content (FAC) and the total available chlorine (TAC) of the water. By subtracting the free available chlorine content from the total available chlorine, the amount of combined available chlorine (CAC) may be calculated. Determination of CAC in water in this manner gives a reasonably accurate reading of its chloramine content.

The present process is more particularly described in the following examples which are intended as illustrative only since numerous modifications and variations therein will be apparent to skilled in the art. In order to simulate the addition of 2-oxazolidinone derivative to a body of water treated with free available chlorine, and the resultant effect of such addition on algae, calcium hypochlorite was added to an aqueous solution of 4,4-dimethyl-2-oxazolidinone, and the resultant solution in various concentrations added to an algae culture.

EXAMPLE 1

To a vessel containing 153.0 grams of an aqueous solution (18.3 percent) of 4,4-dimethyl-2-oxazolidinone were added 3822 grams of chlorine demand free water and a total of 58.36 grams of 71.1 percent granular calcium hypochlorite. The resultant aqueous mixture was stirred and filtered to remove a white precipitate, which was assumed to be calcium carbonate. The aqueous mixture was analyzed and found to contain 3950 parts combined available chlorine (CAC) per million parts of solution (ppm) and 750 ppm of free available chlorine (FAC). Eight days later, 37.5 milliliters of the aqueous mixture were diluted with 250 grams of chlorine demand free water. Analysis of this diluted solution found 360 ppm of combined available chlorine and 0 ppm free available chlorine. The combined available chlorine (CAC) was attributed to 3-chloro-4,4-dimethyl-2-oxazolidinone, which was presumed to have been formed in situ. This final stock solution was again diluted with water to obtain final concentrations of 180, 36, 3.6, and 0.36 ppm combined available chlorine.

EXAMPLE 2

Thirty milliliters of a proteose peptone culture medium was placed into a series of test tubes (200 mm×50 mm) using an automatic pipetter. The tubes were capped, steam sterilized at 121°±2° C. for twenty minutes and allowed to cool to room temperature.

The alga, Chlorella pyrenoidosa, was transferred from a stock agar culture into a proteose peptone medium and maintained at 22°±2° C. in an Erlenmeyer flask to establish a stock culture of the algae. The cooled test tubes were inoculated with alga from the flask to establish an initial cell concentration of approximately $3 \times 10^5$ cells per milliliter (primary culture).

A 1.0 milliliter aliquot of the 360 ppm CAC solution of prepared in Example 1 was charged to each of two appropriately labeled test tubes containing the primary cultures. Two other innoculated, oxazolidinone-untreated tubes containing primary cultures were used as viability controls. This procedure was repeated with 1.0 milliliter aliquots of the 180, 36, 3.6 and 0.36 ppm CAC solutions.

Following two days of incubation at 22°±2° C., with 16 hours of cool fluorescent light while being oscillated at 100 oscillations per minute, a 0.01 milliliter aliquot from each test tube was aseptically transferred to a tube containing 30 milliliters of sterile proteose peptone medium. These subcultures and the primary cultures were maintained under the aforedescribed temperature and light conditions for three weeks. Each week, the test tubes were visually observed and optical density measurements taken. Results are tabulated in Table I.

TABLE I

A. PRIMARY CULTURE VISUAL OBSERVATION RATINGS

| Active Specie (CAC) Conc. (ppm) | Test Weeks | | |
|---|---|---|---|
| | 1 | 2 | 3 |
| 0.00 | 1 | 3 | 3 |
| 0.01 | 0 | 3 | 3 |
| 0.12 | 0 | 2 | 2 |
| 1.2 | 0 | 1 | 2 |
| 5.8 | 0 | 0 | 0 |
| 11.6 | 0 | 0 | 0 |

Key
0 = No Growth
1 = Slight Growth
2 = Moderate Growth
3 = Abundant Growth

B. PRIMARY CULTURES PERCENT CONTROL* OF ALGAL GROWTH

| Active Specie (CAC) Conc. (ppm) | Average Weekly Optical Density Measurements Week | | | Percent, % |
|---|---|---|---|---|
| | 1 | 2 | 3 | |
| 0.00 | 0.15 | 0.45 | 0.49 | — |
| 0.01 | 0.01 | 0.21 | 0.24 | 51.0 |
| 0.12 | 0 | 0.16 | 0.18 | 63.3 |
| 1.2 | 0 | 0.12 | 0.14 | 71.4 |
| 5.8 | 0 | 0 | 0 | 100.0 |
| 11.6 | 0 | 0 | 0 | 100.0 |

*Percent Control = 100 (Average Rating for Control Tubes − Average Rating for Treated Tubes) divided by the Average Rating for Control Tubes. Based on Optical Density Measurements.

The data of Table I show that at combined available chlorine concentrations of 5.8 and 11.6 ppm, no growth of the test algae organism was observed after 3 weeks, i.e., that there was complete control of algal growth. Such concentrations are, therefore, deemed to be algicidal. Table I also shows that only moderate growth (about 50 percent control) of the test algae organism was observed after 3 weeks for a combined available chlorine concentration of about 0.01 ppm. This and higher concentrations (but less than a concentration of 4.5 ppm) are considered to be algistatic.

Although the present method has been described with specific details of certain embodiments thereof, it is not intended that such detail should be regarded as limitations upon the scope of the invention except as and to the extent that they are included in the accompanying claims.

We claim:
1. A method for inhibiting the growth of algae in a stored body of water in the absence of algicidal amounts of free available halogen, which comprises providing in said body of water from about 0.05 to 4.5 ppm of a 2-oxazolidinone and a sufficient amount of a source of halogen to provide from about 0.03 to about 2.8 ppm respectively of combined available halogen based on the corresponding halogen-containing, 2-oxazolidinone, said halogen being selected from the group consisting of chlorine and bromine, said 2-oxazolidinone being represented by the graphic formula:

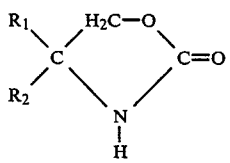

wherein $R_1$ is a $C_1$-$C_4$ alkyl; $R_2$ is selected from the group consisting of $C_1$-$C_4$ alkyl, hydroxy, hydroxymethyl, $C_1$-$C_4$ alkoxy and —Ph—R, wherein Ph is phenylene and R is selected from the group consisting of $C_1$-$C_4$ alkyl, $C_1$-$C_4$ alkoxy and hydroxy.

2. The method of claim 1 wherein $R_1$ and $R_2$ are each a $C_1$-$C_4$ alkyl, and the halogen is chlorine.

3. The method of claim 2 wherein $R_1$ and $R_2$ are each methyl.

4. The method of claim 3 wherein the amount of 2-oxazolidinone provided in said body of water is from about 2 to about 4 ppm, and the amount of combined available chlorine provided by the chlorine-containing 2-oxazolidinone is respectively from about 1.2 to about 2.5 ppm.

5. The method of claim 3 wherein the body of water is a swimming pool or hot tub.

6. A method for inhibiting the growth of algae in a stored body of recreational water selected from the group consisting of swimming pools and hot tubs in the absence of biocidal amounts of free available chlorine, which comprises introducing into said body of water from about 0.05 to 4.5 ppm of a 2-oxazolidinone and a source of chlorine in amounts sufficient to provide from about 0.03 to about 2.8 ppm respectively of combined available chlorine, based on the corresponding chlorine-containing 2-oxazolidinone, said combined available chlorine being present in amounts sufficient to be algistatic but insufficient to be algicidal, said 2-oxazolidinone being represented by the graphic formula:

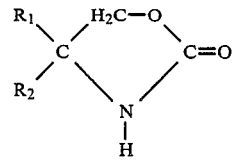

wherein $R_1$ and $R_2$ are each a $C_1$-$C_4$ alkyl.

7. The method of claim 6 wherein $R_1$ and $R_2$ are each methyl.

8. The method of claim 7 wherein the amount of 2-oxazolidinone introduced into the body of water is sufficient to provide from about 1.2 to about 2.5 ppm respectively of combined available chlorine based on the corresponding chlorine-containing 2-oxazolidinone.

9. The method of claim 7 wherein the source of chlorine is selected from the group consisting of chlorine, calcium hypochlorite, sodium hypochlorite, and chloroisocyanurates.

10. A method for inhibiting the growth of algae in a stored body of recreational water, which comprises establishing 3-chloro-4,4-dimethyl-2-oxazolidinone in said water in amounts sufficient to provide from about 0.03 to about 2.8 ppm of combined available chlorine, said amounts being sufficient to be algistatic but insufficient to be algicidal.

11. The method of claim 10 wherein the body of recreational water is a swimming pool or hot tub.

* * * * *